March 31, 1931.  O. RIEMANN  1,798,811
APPARATUS FOR SEPARATING STARCH FROM STARCH
CONTAINING MATTER BY WASHING OUT THE LATTER
Filed Aug. 24, 1928   2 Sheets-Sheet 1

Inventor:

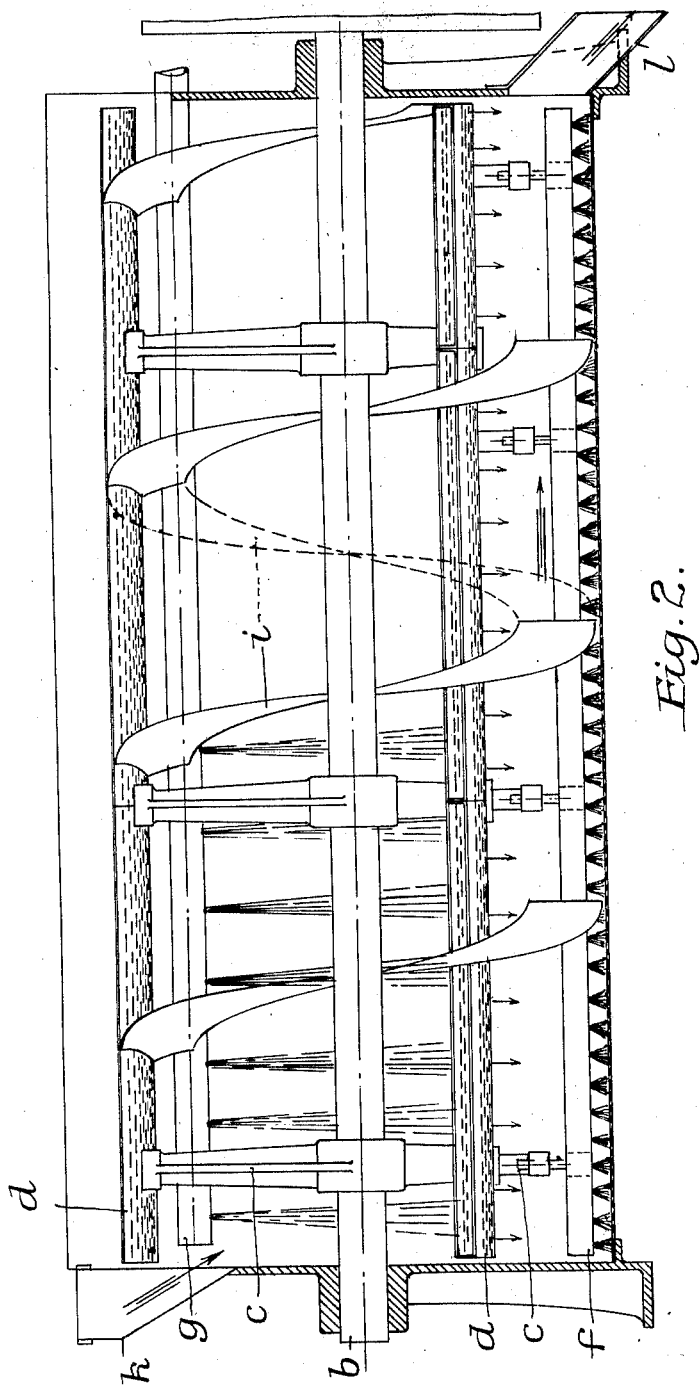

Patented Mar. 31, 1931

1,798,811

UNITED STATES PATENT OFFICE

OTTO RIEMANN, OF WELLINGSBUTTEL, GERMANY

APPARATUS FOR SEPARATING STARCH FROM STARCH-CONTAINING MATTER BY WASHING OUT THE LATTER

Application filed August 24, 1928, Serial No. 301,853, and in Germany November 26, 1927.

The present invention relates to the production of starch from starch-containing plants such as potatoes, sweet potatoes and the like. The plants, or rather the fruits of the plants employed in the said production of starch, after being thoroughly cleaned, are finely reduced by suitable disintegraters and the pulp thus obtained is treated in washing apparatus to separate as completely as possible the starch therefrom.

Special objects of the invention are to render more efficient, serviceable and durable in operation washing apparatus of the kind referred to.

With these ends in view the invention consists in the novel combination, arrangement and adaptation of parts, all as more fully hereinafter explained, shown in the accompanying drawings and finally set out in the appended claims.

In the drawing is shown a washing apparatus embodying the features of the present invention.

Fig. 2 is a longitudinal vertical section of same.

Figure 1:
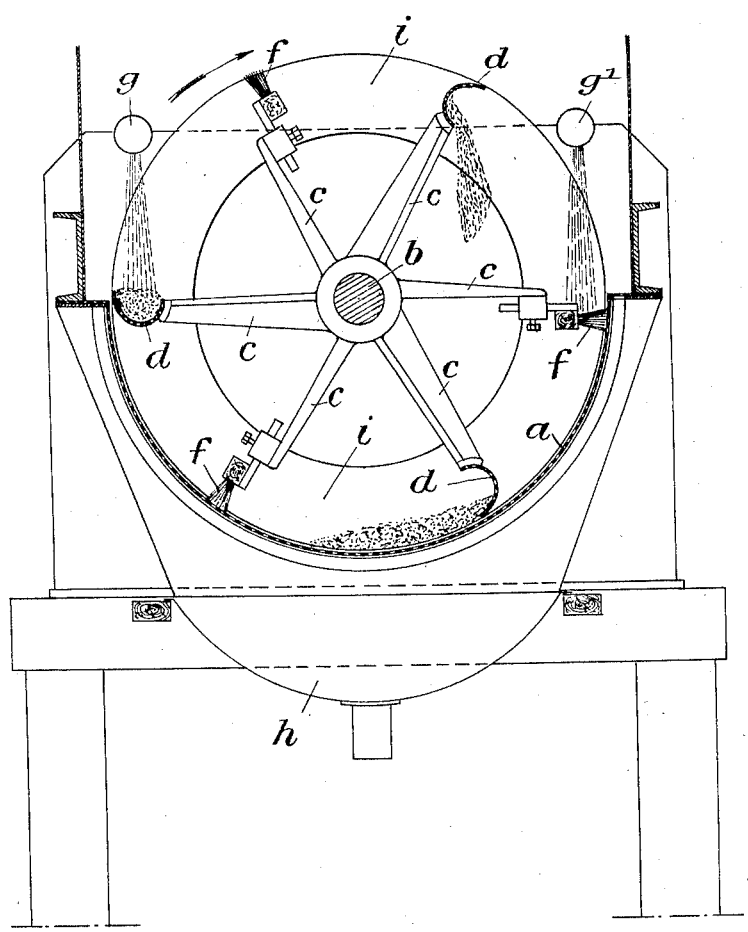
Fig. 1 is a transverse vertical section of the apparatus.

Supported in a suitable frame is a trough $a$ and a power driven shaft $b$, a pulley or other suitable driving means being employed on the end of the shaft. The trough $a$ is made of perforated sheet metal bent so as to form a half cylinder, as shown. The power driven shaft $b$ is supported concentric with the trough $a$. It carries by means of a feathered bushing or fixed in any other suitable manner radial arms $c$, at the free extremities of which are attached shovels or scoops $d$ and brushes $f$, preferably in alternating arrangement as shown. In rotating the shaft $b$ the shovels or scoops $d$ and the brushes $f$ successively come in contact with the inner circular surface of the trough $a$.

Above the shaft $b$ outside the circle described by the shovels or scoops $d$ and the brushes $f$ on rotating the shaft, are arranged water douches or sprayers $g$, which serve for spraying or sprinkling the contents of the trough $a$.

The trough $a$ is charged by means of the feed hopper $k$ with the material to be treated at one end, whilst at the other end a chute $l$ is provided for carrying off the material after treatment, as is usual with washing apparatus of this kind.

A helical conveyor $i$ in fixed connection with the shaft $b$ or with the arms $c$ of the latter respectively, serves for transporting the material to be treated from the supply end to the discharge end of the trough $a$.

In side the trough $a$ the material to be treated is transversely moved and agitated by means of the shovels or scoops $d$ and the brushes $f$, so that the water issuing from the douches or sprayers $g$, $g^1$ washes out the material, separating therefrom the starch in the form of starch milk, which escapes through the perforations in the trough $a$ reaching the receiver $h$ (Fig. 1), from which it is carried off by means of suitable conduits for further treatment, as usual.

The separation of the starch is materially assisted by means of the shovels or scoops $d$, which raise the material from the bottom of the trough $a$ and carry it towards the douche or sprayer $g$ in front of same. The water jets issuing from said douche or sprayer $g$ fully act upon the material lifted by the shovels or scoops $d$, completely washing out the starch milk therefrom, which escapes through perforations in the shovels or scoops. The hollow shovels or scoops $d$ retain the material whilst it is being sprayed by means of the douche or sprayer $g$. In view of the hollow form of the shovels or scoops $d$ the force of the water jets issuing from the douche or sprayer $g$ cannot empty the shovels or scoops.

During the rotation of the shaft $b$ in the direction of the arrow (Fig. 1), the shovels or scoops $d$ pass the zenith of their circular path and allow the washed out material to drop out and to reach again the trough $a$.

After passing the douche or sprayer $g^1$ at the other side of the trough $a$, the shovels or scoops $d$ are rinsed at the convexed rear surface by the jets issuing from said douche or sprayer $g^1$, so that the perforations in the shovels or scoops are cleaned and fully opened.

The brushes $f$ acting on the perforated bottom of the trough a, besides agitating the contents of the latter, facilitate the escape of the starch milk separated from the material under treatment.

I wish it to be distinctly understood, that I do not limit myself to the precise constructions shown, variations in the arrangement and combination of the several parts being possible according to desire or requirement without departing from the scope and spirit of the invention.

What I do claim as my invention and desire to secure by Letters Patent is:

1. Washing apparatus of the kind described comprising a perforated trough of semi-cylindrical shape at the bottom part, a receiver beneath the trough, a power driven shaft supported concentrically in regard to the semi-cylindrical bottom part of the trough, radial arms on said shaft, perforated hollow shovels or scoops and brushes at the free extremities of said radial arms preferably in alternating arrangement and adapted to successively come in contact with the inner surface of the aforesaid perforated trough, a helical conveyor in fixed connection with the shaft for transporting the material to be treated from the supply end to the discharge end of the trough and douches or sprayers for spraying or sprinkling the contents of the trough, substantially as and for the purpose set forth.

2. Washing apparatus of the kind described comprising a perforated trough of semi-cylindrical shape at the bottom part, a receiver beneath the trough, a power driven shaft supported concentrically in regard to the semi-cylindrical bottom part of the trough, radial arms on said shaft, perforated hollow shovels or scoops and brushes at the free extremities of said radial arms preferably in alternating arrangement and adapted to successively come in contact with the inner surface of the aforesaid perforated trough, a helical conveyor in fixed connection with the shaft for transporting the material to be treated from the supply end to the discharge end of the trough and douches or sprayers for spraying or sprinkling the contents of the trough, one douche or sprayer issuing its jets against the front surface of the shovels or scoops when filled, the other against the rear surface of same when empty or during emptying, substantially as and for the purpose set forth.

In witness whereof I have hereunto signed my name this 9th day of August, 1928.

OTTO RIEMANN.